Nov. 13, 1934. H. I. DANZIGER Re. 19,370

ELECTROLYTIC CONDENSER

Original Filed March 28, 1930 2 Sheets-Sheet 1

INVENTOR
Harold I. Danziger
BY
Frederick Breitenfeld
ATTORNEY

ELECTROLYTIC CONDENSER

Original Filed March 28, 1930 2 Sheets-Sheet 2

INVENTOR
Harold I. Danziger
BY
Frederick Breitenfeld
ATTORNEY

Reissued Nov. 13, 1934

Re. 19,370

UNITED STATES PATENT OFFICE 19,370

ELECTROLYTIC CONDENSER

Harold I. Danziger, Pittsfield, Mass., assignor, by mesne assignments, to Sprague Specialties Company, North Adams, Mass., a corporation of Massachusetts Original No. 1,948,289, dated February 20, 1934, Serial No. 439,578, March 28, 1930. Application for reissue July 20, 1934, Serial No. 736,899

21 Claims. (Cl. 175—315)

My present invention relates generally to electrical condensers, and has particular reference to an electrolytic condenser of improved structure.

An electrolytic condenser consists preferably of a container for a liquid electrolyte, an electrode immersed in the electrolyte and coated with a very thin, electrolytically-deposited film of highly dielectric character. The immersed electrode serves as one terminal of the condenser, and it is customary to employ the container as the opposite terminal with which electric contact may conveniently be made.

This general character of an electrolytic condenser gives rise to difficulties in manufacture, and particularly in mounting the same upon a suitable supporting platform or chassis. The condenser should be so supported that the electrode will be completely immersed; a vent should be provided to permit escape of gases should they generate too rapidly; the formation of sediment should be contemplated and means should be provided to receive it; and the container should be liquid-tight.

A general object of my present invention is to provide an electrolytic condenser structure which is of simplified nature from the standpoint of manufacture and assembly; which embodies all the requisite qualities which the peculiar characteristics of an electrolytic condenser require; which operates smoothly and efficiently without any likelihood whatsoever of corrosion or the like; which is extremely compact and staunch; and which is peculiarly efficient from the standpoint of mounting the same upon a chassis and making electrical connections thereto.

One feature of my invention lies in providing a condenser of the foregoing character wherein not only the electrode, but also all the leads and terminals associated therewith, are completely immersed in the liquid electrolyte. Inasmuch as corrosion invariably attacks those portions which are not thoroughly immersed, this feature of my invention is of extreme importance and advantage.

Another feature lies in an arrangement whereby the condenser structure may be inconspicuously, yet firmly and securely, mounted upon a supporting platform or chassis. My present structure requires no makeshift arrangements for supporting the container in a vertical position upon a chassis, and requires no cumbersome hooks or the like.

A further feature of my invention lies in providing an arrangement whereby the electrical connection with the submersed electrode may be made beneath the chassis upon which the condenser is mounted. By thus dispensing with the necessity for wires and leads above the chassis, and heretofore usually associated with the upper portions of the electrolytic condensers, I am enabled to provide for compact and highly efficient and neat mounting of one or a plurality of electrolytic condensers.

Briefly, it is a more specific yet highly important feature of my invention to provide a container within which a submersed electrode is supported upon a conducting rod which extends out of the container through a wall other than the top wall thereof, and in a preferred construction, through the bottom wall.

I achieve the foregoing objects and such other objects as may hereinafter appear or be pointed out, in the manner illustratively exemplified in the accompanying drawings, wherein—

Figure 1:
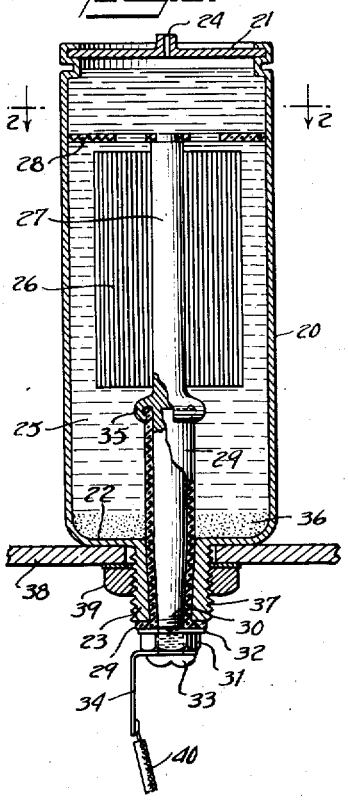
Figure 1 is a vertical cross-sectional view through an electrolytic condenser mounted upon a chassis and constructed in accordance with my present invention.
Figure 2:
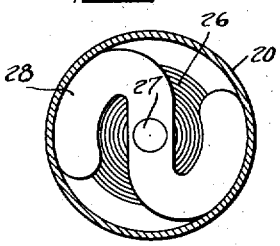
Figure 2 is a horizontal cross-sectional view taken substantially along the line 2—2 of Figure 1.

In Figure 1, I have shown a container 20 which is preferably tubular in shape and constructed of relatively thin yet strong conducting material, such as sheet aluminum. It is provided with a top wall 21 and a bottom wall 22. In the form illustrated, the bottom wall 22 is integral with the side walls, but the top wall 21 has been shown as a separate element or disk held in position by spinning the upper edge of the container proper around the margin thereof.

In Figure 1, I have also shown a downwardly extending neck 23 formed integrally with the bottom wall 22, and exteriorly threaded. Furthermore, the bore of the neck 23 is slightly tapered in a downward direction for a purpose presently to be described.

The top wall of the container may or may not be formed as a separate element, as shown in Figure 1, and may, for example, be an integral spun portion of the container proper. In either event, it is provided with a small opening or vent 24 which is usually sealed by a removable rubber cap or the like.

Within the container 20 is the liquid electrolyte 25, the upper level of which is as close as possible to the under-surface of the top wall 21.

Immersed in the electrolyte is an electrode 26 which I have shown in the form of a spirally-wound aluminum sheet or strip, this electrode being in the finished condenser coated with a very thin film of electrolytically-deposited material. The electrode is supported upon the core or rod 27 which is of conducting material and which may, if desired, have its upper end engaged within a spacer 28 or the like. In the illustrated form, I have shown the spacer of S-shape, and its purpose is to maintain the electrode 26 spaced from the walls of the container 20. I have found, however, that this spacer is not essential under all circumstances, the structure being sufficiently firm in other respects to hold the electrode in its contemplated position.

In accordance with my present invention, the rod 27 extends out of the container 20 below the level of the electrolyte 25, and in this way, no portion of the rod or of the electrode is subjected to the corrosive action of air or gases. In the preferred form illustrated, the rod 27 extends downwardly through the bottom wall 22 and, more particularly, through the neck 23. The bottom portion of the rod 27 is slightly tapered so as to fit snugly within the neck 23 and cooperate with the taper of the latter in a manner presently to be described.

For the purpose of insulating the rod 27 from the container 20, I provide a sleeve 29 of insulating material, such as rubber, which sleeve encircles the lower portion of the rod as it passes through the neck 23. Preferably, the lower end of the sleeve is flanged outwardly to form the equivalent of a washer.

In Figure 1, I have shown the extreme lower portion of the rod 27 provided with the exterior screw threads 30. When the device is assembled, the rod is passed downwardly through the neck 23, and a nut 31 is drawn tight upon the threads 30, thereby wedging the rod 27 within the neck 23, and forming a liquid-tight joint. A washer 32 may be advantageously employed, and the extreme end of the rod is preferably swaged or upset as at 33 after the tightening has been effected, this manipulation preventing subsequent withdrawal of the nut 31.

During the upsetting, a lead connection 34 may be associated with the rod 27 in the manner shown.

An important feature of my invention lies in extending the sleeve 29 upwardly into the container for a considerable distance, thereby encircling the lower portion of the rod 27 within the container 20. In Figure 1, I have shown a flange 35 formed upon the rod 27 immediately beneath the electrode 26, this flange being spun over the upper edge of the sleeve 29 to grip the same firmly and clamp it against the rod 27.

The upwardly-extending sleeve 29 forms a shield for the lower portion of the rod 27 and prevents the sediment indicated at 36 from piling up and ultimately forming a possible short-circuit between the material of the container 20 and the rod 27.

The structure shown in Figure 1 is provided with threads 37, upon the exterior of the neck 23, so that when the condenser is mounted upon a chassis or supporting platform 38 by the manufacturer of, for example, a radio set or apparatus, it is only necessary to pass the neck 23 downwardly through a suitable aperture in the chassis 38 and thereupon to apply a tightening nut 39 to the threads 37. The nut 31 and all the parts adjacent to it are made of sufficiently small diameter to permit the nut 39 to be applied in the manner shown. The electrical connection shown illustratively at 40 may be made to the tab 34 after the condenser is mounted.

It will be noted upon viewing Figure 1 that the mounted condenser is firmly held in proper position and yet the upper portion of the chassis 38 is totally devoid of cumbersome fastening devices, hooks, parts, etc.; and furthermore, that there are no leads of any character extending to any portion of the condenser structure. As a result, a number of such condensers may be mounted in close proximity to each other; or they may be individually mounted in a compact relationship to other electrical apparatus; and the entire assembly is simplified and rendered more compact, attractive, and efficient.

Figure 3:
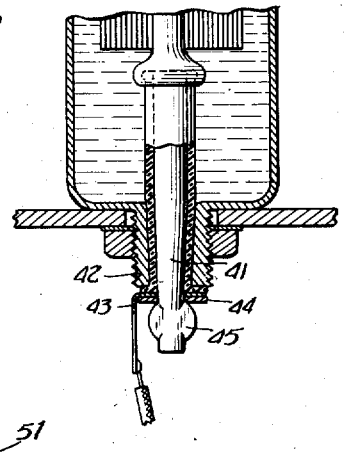
Figures 3–8 are fragmentary cross-sectional views taken in substantially the same direction as Figure 1, showing different modifications.

The manner in which the several portions of the structure may be associated with one another may be varied in a number of ways to suit differing requirements. For example, in Figure 3 I have shown a structure wherein the threads 30 and the nut 31 of Figure 1 have been dispensed with. In Figure 3, the supporting rod 41 is pulled downwardly into wedged relationship within the neck 42, and after applying a connector 43 and a washer 44 or the like, the end of the rod 41 is swaged or hammered outwardly, or similarly expanded, as at 45. This deformation of the end of the rod 41 serves to provide a head thereon which prevents retractive movement of the rod and thereby serves the function of holding the rod 41 in liquid-tight association with the neck 42. In other respects, the showing of Figure 3 is the same as the structure shown in Figure 1.

Figure 4:
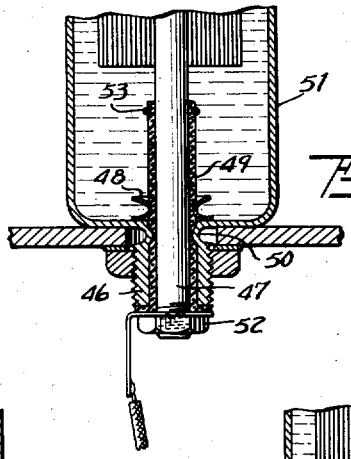

In Figure 4 I have shown a construction wherein the neck 46 is not tapered and the rod 47 is, therefore, also untapered and substantially cylindrical. For the purpose of providing a liquid-tight joint, I spin a ring 48 around the insulating sleeve 49 at approximately the position shown, this ring serving to clamp the sleeve 49 firmly to the rod 47. To provide a similar liquid-tight joint between the sleeve 49 and the neck 46, I have shown a construction wherein the neck is spun inwardly at its base 50, this being accomplished by a suitable tool and serving to clench the material of the container 51 into close liquid-tight association with the sleeve 49.

The lower end of the rod 47 is threaded and a nut 52 engages therewith, but this nut need not be so tightly or securely screwed into engagement with the rod 47 as in the previous embodiments.

In place of the flange 35 upon the supporting rod, I may employ a clamping ring, such as that shown at 53, for holding the upper end of the sleeve 49 firmly around the rod 47.

In the form shown in Figure 4, the ring 48 serves the additional function of a stop or abutment, and facilitates assembly of the condenser during its manufacture. Thus, after the ring 48 has been applied to the rod 47, and after the rod is thereupon inserted through the container 51 into the neck 46, the ring 48 serves as a stop when it encounters the bottom wall of the container. Thereupon, the nut 52 may be tightened in a simple and rapid manner, and the neck clenched inwardly, as at 50.

Figure 5:
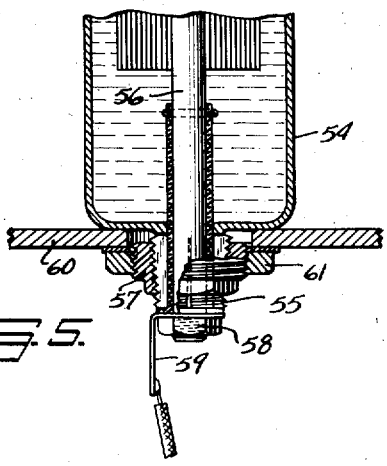

In Figure 5, I have shown a construction wherein the container 54 is provided with a threaded neck 55, the latter being split longitudinally by one or more slots. The neck 55 is downwardly tapered on its exterior by a slight degree, and after the rod 56 has been passed downwardly through the neck, a nut 57 is tightened up upon the neck 55, and serves thereby to clench together the several sections of the neck and form a secure liquid-tight joint. The lower end of the rod is again secured by a nut 58 which serves at the same time to hold an electric contact tab 59.

I have shown the nut 57 exteriorly threaded, and these exterior threads serve the function of permitting attachment of the structure to a chassis 60 substantially in the manner hereinbefore described. Thus, I have shown a nut 61 screw-threaded upon the exterior threads of the nut 57 and thereby serving to hold the structure firmly down upon the chassis 60.

Figure 6:
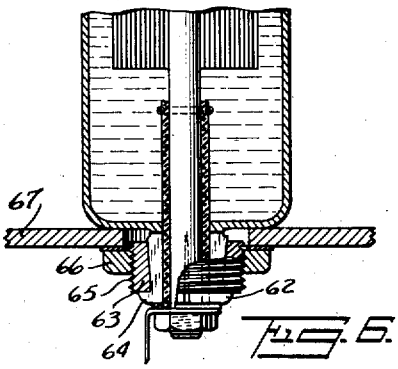

In Figure 6, I have shown a construction similar to that of Figure 5, except that the neck 62 is not exteriorly threaded. The neck 62 is longitudinally slit and is downwardly tapered on its exterior surface. In place of the interiorly-threaded nut 57 of Figure 5 I employ a nut or tightening ring 63 which is devoid of interior threads, this ring 63 being forced upwardly onto the neck 62 while the latter is pulled downwardly. This clenches the several parts together and forms a liquid-tight join' and the parts are held in this relationship by upsetting or spreading the lower end of the neck 62, as shown at 64.

The ring 63 is exteriorly threaded, however, as shown at 65, and a nut 66 is again employed to hold the entire structure in association with a chassis 67.

Figure 7:
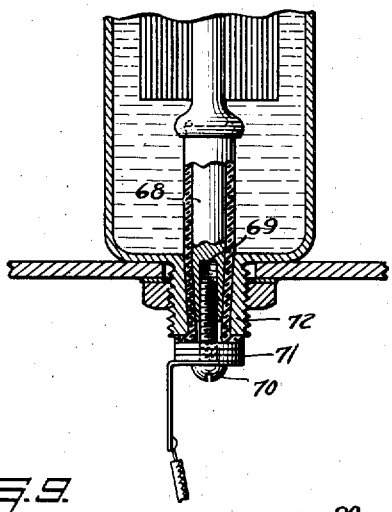

In Figure 7, I have shown a structure similar to that of Figure 1, except that the engagement between exterior threads on the rod and interior threads on a nut are reversed. I have shown the rod 68 provided with the interiorly-threaded bore 69, and I cause a stud 70 to engage within the bore 69 to draw the rod 68 downwardly. A series of washers 71 are interposed between the head of the stud 70 and the end of the neck 72, and it will be obvious that tightening-up upon the stud 70 will draw the rod 68 into a wedged relationship within the tapered neck 72.

Figure 8:
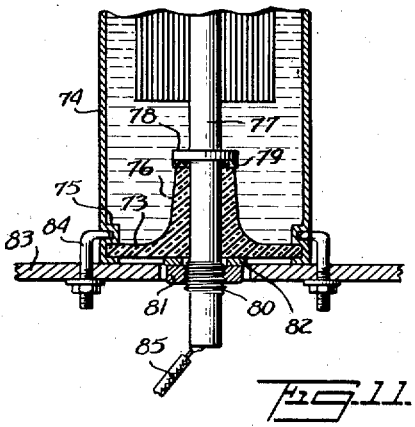

In Figure 8, and in the succeeding figures, I have shown a slightly different association of parts wherein the bottom of the container is not integral with the remainder of the container but is in the form of an insulating disc. Such disc serves at one and the same time to provide a secure and liquid-tight joint; to insulate the rod from the container; and to form a shield for the lower portion of the rod. I have shown a disc 73 of insulating material held in association with the conducting material of the container 74 by spinning the lower edge of the container 74 around the periphery of the disc 73. During this procedure, I form an annular groove 75 in the exterior of the container 74 close to the bottom thereof.

The disc 73 is provided with the upwardly-extending neck 76 which serves as a shield for the lower portion of the rod 77. I have shown the rod provided with a flange or collar 78 which is adapted to rest upon the top of the neck 76, with a washer 79 interposed. The lower portion of the rod 77 is exteriorly threaded, as at 80, and a nut 81 engages with these threads and holds the rod firmly in proper relationship to the disc 73. A washer 82 is preferably employed along with the nut 81.

In this form, the unit is held down upon the chassis 83 by means of the small fingers 84 extending upwardly through the chassis 83 and engaging within the groove 75. Also, the electric connection shown at 85 may be made directly to the bottom of the rod 77.

If desired, the rod 77 may be integrally molded into position with the disc 73, this manner of assembly serving to make a very secure and liquid-tight joint.

Figure 9:
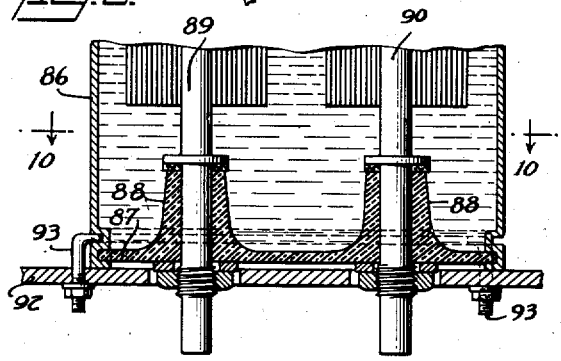
Figure 9 is a similar cross-sectional view showing a further modification, and taken substantially along the line 9—9 of Figure 10.
Figure 10:
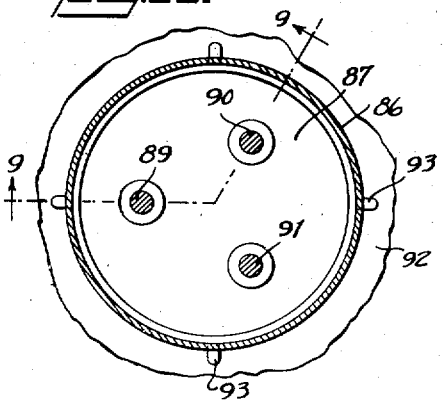
Figure 10 is a cross-sectional plan view taken substantially along the line 10—10 of Figure 9.

In Figures 9 and 10, I have shown a construction wherein a plurality of electrodes may be immersed in a single electrolyte contained in a single container. Each individual electrode and its supporting rod is similar to the showing of Figure 8. A relatively larger container 86 is provided with a bottom 87 in the form of an insulating, preferably molded, disc which has a series of upwardly-extending necks 88 similar to the neck 76 of Figure 8. Each individual rod, as, for example, the rods 89, 90, and 91, is associated with one of the upwardly-extending necks in the manner shown in Figure 8. The entire container may be held down upon a chassis 92 by means of fingers, such as shown at 93. Desired electrical connections may be made beneath the chassis 92 to the several projecting ends of the rods 89—91.

Figure 11:
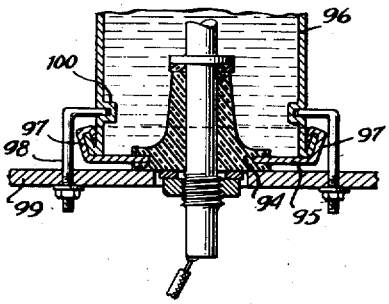
Figures 11 and 12 are views similar to Figures 3–8 showing other modifications.

Another manner in which a molded insulating piece may be employed is illustrated in Figure 11. Instead of spinning the lower portion of the container around the margin of the molded disc, I provide a metallic annulus in molded association with the disc, and associate the annulus with the body of the container. For example, the disc 94 is initially produced with an annular metallic ring 95 molded in the periphery thereof. This ring is then spun into engagement with the lower edge of the container 96 in any suitable manner, and preferably by the method employed in can construction. I have illustratively shown at 97 one manner of clenching the edge of the annulus 95 to the lower edge of the container 96. Fingers 98 may serve to hold the structure upon a chassis 99, and, if desired, these fingers may engage over the clenched portions 97 instead of in the groove 100, as illustrated.

Figure 12:
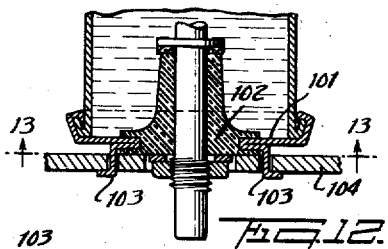
Figure 13:
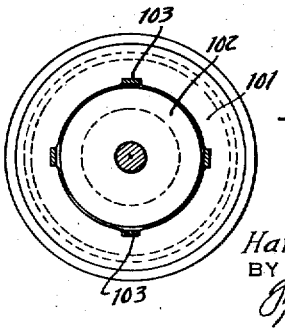
Figure 13 is a cross-sectional view taken substantially along the line 13—13 of Figure 12.

In Figures 12 and 13, I have shown a modification of the structure of Figure 11, an annulus 101 being molded in the periphery of a disc 102, and portions of the annulus being bent downwardly in the form of tabs 103. In mounting the structure upon a chassis 104, the latter is provided with suitable slots through which the tabs 103 may be passed. It is then necessary merely to bend the tabs as shown in Figure 12, whereby they will clench the under-surface of the chassis 104, this being a very simple and rapid procedure and serving nevertheless to hold the structure in sufficiently secure association with the chassis 104.

Other modifications and other forms of construction will suggest themselves to those skilled in the art, and I do not mean to restrict myself to any specific form, except as I may be compelled to do so by prior art of which I am not now aware. Regardless of the specific details of construction, it will be obvious that I have provided an electrolytic condenser structure of highly advantageous and simplified character; one which is not only compact and of workmanlike appearance, but which is capable of rapid and inexpensive assembly, manufacture, and ultimate association with a supporting chassis. Furthermore, it will be noted that my structure is extremely efficient from the standpoint of durability and operation, the entire electrode being in each case completely immersed in the electrolyte at all times, the likelihood of corrosion being thereby eliminated, the formation of sediment being suitably guarded against, and the necessity for electrical connections above the level of the supporting chassis being efficiently eliminated.

The exterior electrical connections to the present type of condenser structure are made to the container itself, on the one hand, and to the end of the downwardly extending rod, on the other hand, these two parts of the structure being insulated from each other. The container or can thus serves as a "connection terminal", and the word "terminal", as the same is used herein and in the appended claims, is obviously intended to include this function within its significance.

I have not illustrated the sediment 36 of Figure 1 in the remaining figures, since it has been shown in Figure 1 for purposes of illustration only and to describe the function of the shield around the bottom portion of the rod. Any sediment which may form, however, is in every case suitably insulated from any likelihood of short-circuit between the material of the container and the immersed electrode.

In certain cases, it may be desirable to coat the rod at its lower portion with a suitable enamel or varnish which is immune to attack by the liquid electrolyte. Such coating of enamel or varnish will underlie the insulating sleeve and may be sprayed onto the rod or applied in any desired manner. It guards against corrosion of the lower portion of the rod which might be caused by seepage of the electrolyte into the space between the insulating sleeve and the rod. I do not contemplate that any such seepage will be capable of occurring if the insulating sleeve is properly applied, but I mention this possible construction as a further safeguard which may be employed if desired.

Furthermore, although I have illustrated the insulating sleeve and the shield for the lower portion of the rod as a separate element and as a molded element, nevertheless, in certain instances, it may be found desirable to provide this shield and insulating sleeve in the form of an electroplated layer or coating of rubber, celluloid, or the like; and also, it will be understood that the size of the sleeve or shield will depend upon the amount of sediment reasonably to be expected from the particular electrolyte which is used.

It will be understood that wherever I have used the term "liquid electrolyte", both in the specification and in the appended claims, I mean to include within this term the various types of jelly-like or semi-solid electrolytes.

The variety of modifications herein illustrated and described are given for purposes of illustration only and to show, by way of example, the manner in which my invention may be carried into effect in a variety of different ways, depending in a large measure upon different requirements. It is, therefore, obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In an electrolytic condenser, a container of conducting material adapted to serve as one terminal of the condenser and having top and bottom walls, the top wall having a vent therein and the bottom wall having an aperture therein, an electrode in said container and adapted to serve as a complementary terminal of the condenser, a rod supporting said electrode and extending downwardly through said aperture, a liquid electrolyte in said container and completely submersing said electrode, and means for making the joint between said rod and aperture liquid-tight; said means comprising a depending neck on said bottom wall and snugly encircling said rod, and means for squeezing said neck around said rod.

2. In an electrolytic condenser, a container of conducting material adapted to serve as one terminal of the condenser and having top and bottom walls, the top wall having a vent therein and the bottom wall having an aperture therein, an electrode in said container and adapted to serve as a complementary terminal of the condenser, a rod supporting said electrode and extending downwardly through said aperture, a liquid electrolyte in said container and completely submersing said electrode, and means for making the joint between said rod and aperture liquid-tight; said means comprising a longitudinally-split neck on said bottom wall and encircling said rod, a resilient element between said rod and neck, and means for pinching the split sections of said neck together.

3. In an electrolytic condenser, a container of conducting material adapted to serve as one terminal of the condenser and having top and bottom walls, the top wall having a vent therein and the bottom wall having a downwardly-projecting, tapered, hollow neck, a complementary electrode in said container, a tapered rod supporting said electrode and extending through said neck, a liquid electrolyte in said container and completely submersing said electrode, and means for wedging said rod and neck into liquid-tight association.

4. In an electrolytic condenser, a container of conducting material adapted to serve as one terminal of the condenser and having top and bottom walls, the top wall having a vent therein and the bottom wall having a downwardly-projecting, tapered, hollow neck, a complementary electrode in said container, a tapered rod supporting said electrode and extending through said neck, a liquid electrolyte in said container and completely submersing said electrode, and means for wedging said rod and neck into liquid-tight association; said means comprising screw threads at the end of said rod, and a complementary screw-threaded element engaging said threads and adapted to bear against the end of said neck.

5. In an electrolytic condenser, an electrolyte container of conducting material adapted to serve as one terminal of the condenser and having top and bottom walls, the top wall having a vent and the bottom wall having a downwardly projecting, hollow attachment neck adapted to support the container upon a chassis, a complementary electrode in said container and spaced from the walls thereof, a conducting rod supporting said electrode and extending downwardly and snugly through said neck, an insulating sleeve in said neck and encircling said rod so as to insulate the latter from said container, and means for squeezing the neck around the sleeve and rod to make the joint between said rod and neck liquid-tight.

6. In combination with a supporting platform having an opening therethrough, an electrolytic condenser comprising an electrolyte container of conducting material adapted to serve as one terminal of the condenser, said container having a top wall with a vent therein and a bottom wall provided with a depending, hollow attachment neck adapted to be engaged in said platform opening to support the condenser, a complementary electrode in said container, a rod supporting said electrode and extending downwardly and snugly through said neck, whereby said rod will serve as an electric terminal beneath said platform, and a nut element engaging said neck beneath the platform to secure the condenser on said platform.

7. In combination with a supporting platform having an opening therethrough, an electrolytic condenser comprising an electrolyte container of conducting material adapted to serve as one terminal of the condenser, said container having a top wall with a vent therein and a bottom wall provided with a depending, hollow neck, said neck extending downwardly through said opening in the platform, a complementary electrode in said container, a rod supporting said electrode and extending downwardly and snugly through said neck, and means engaging said neck beneath the platform to secure said container on said platform.

8. An electrolytic condenser comprising a substantially cylindrical electrolyte container of conducting material adapted to serve as one terminal of the condenser, a vent provided in one end wall of the container, a hollow attachment neck of reduced diameter projecting from the opposite end wall, said neck being adapted to pass through a supporting platform for attachment thereto so as to mount the container neck downwardly upon said platform, an electrode in said container and spaced from the walls thereof and adapted to serve as a complementary terminal of the condenser, a supporting rod for said electrode extending downwardly and snugly through said neck, an insulating sleeve in said neck and around said rod, said sleeve extending upwardly into the container to shield the lower portion of said supporting rod from sediment, and means for squeezing said neck around said sleeve and rod so as to make the joint liquid-tight.

9. An electrolytic condenser comprising a substantially cylindrical electrolyte container of conducting material adapted to serve as one terminal of a condenser, a vent provided in one end wall of the container, a hollow, interiorly-tapered attachment neck projecting from the opposite end wall, said neck being adapted to pass through a supporting platform for attachment thereto so as to mount the container neck downwardly upon said platform, an electrode in said container and spaced from the walls thereof and adapted to serve as a complementary terminal of the condenser, a supporting rod for said electrode extending downwardly and snugly through said neck and tapered at its lower portion, an insulating sleeve in said neck and around said rod and extending upwardly into the container to shield the lower portion of said rod from sediment, and means for retaining said rod and neck in a wedged relationship so as to make a liquid-tight joint.

10. As a new article of manufacture, an electrolyte container for an electrolytic condenser, said container comprising a tubular, metallic member adapted to serve as one terminal of the condenser complementary to an electrode adapted to be immersed in the electrolyte, said tubular member having a vent in one end wall and a projecting attachment neck of substantially reduced diameter at the other end wall, said neck being interiorly tapered to permit a supporting rod for said immersed electrode to be associated in wedged relationship thereto, whereby said neck may be engaged through a supporting platform to mount the container neck downwardly and vent upwardly upon said platform.

11. In combination with a supporting platform having an opening therethrough, an electrolytic condenser comprising an electrolyte container of conducting material adapted to serve as one terminal of the condenser, said container having a vent therein and a bottom wall provided with a depending, hollow neck, said neck extending downwardly through said opening in the platform, a complementary electrode in said container, a conducting rod associated with said electrode and extending downwardly and snugly through said neck, and means engaging said neck beneath the platform to secure said container on said platform.

12. In combination with a supporting platform having an opening therethrough, an electrolytic condenser structure comprising a substantially cylindrical container of conducting material adapted to serve as one connection terminal of the condenser, said container having a vent therein and a bottom wall provided with a depending hollow neck, said neck extending downwardly through said platform opening, a condenser electrode in said container and insulated from the latter, a conducting rod electrically connected at its inner end to said electrode and extending downwardly and snugly through said neck to provide a complementary connection terminal beneath said platform, and means engaging said neck beneath the platform to secure the container on said platform.

13. In an electrolytic condenser, an electrolyte container of conducting material adapted to serve as one terminal of the condenser and having top and bottom walls, the top wall having a vent and the bottom wall having a downwardly projecting hollow attachment neck adapted to support the container upon a chassis or platform, a complementary electrode in said container and spaced from the walls thereof, a conducting rod supporting said electrode and extending downwardly and snugly through said neck, and an insulating sleeve in said neck and encircling said rod so as to insulate the latter from said container, the material of the neck being deformed so as to clench the neck around the sleeve and rod to make the joint between said rod and neck liquid-tight.

14. In an electrolytic condenser, a metallic container having a hollow neck, an electrolyte contained in the container and an electrode in said container extending into said electrolyte and spaced from the wall of the container, a conducting rod supporting said electrode and extending through said neck and an insulating sleeve in said neck encircling said rod so as to insulate the latter from said container, said neck being deformed into liquid-tight association with the sleeve.

15. In an electrolytic condenser, a metallic container having a hollow neck, an electrode in said container and an electrolyte in which said electrode is submersed, a conducting rod supporting said electrode and extending through said neck, and an insulating sleeve surrounding said rod within said neck, said neck being circumferentially deformed into engagement with said sleeve to form a liquid-tight joint therewith.

16. In an electrolytic condenser a metallic container having a hollow neck, an electrolyte contained in the container and an electrode in said container extending into said electrolyte and spaced from the wall of the container, a rod supporting said electrode and extending through said neck and means for wedging said rod and neck into liquid-tight association.

17. In an electrolytic condenser a metallic container having a hollow neck, an electrolyte contained in the container and an electrode in said container extending into said electrolyte and spaced from the wall of the container, a rod supporting said electrode and extending through said neck, and a resilient annular member within said neck and encircling said rod, said annular member being deformed into liquid-tight association with said rod and neck.

18. In an electrolytic condenser, a container of conducting material adapted to serve as one terminal of the condenser and having an apertured wall, an electrode in said container, a rod supporting said electrode and extending outwardly through said aperture, an electrolyte in said container into which said electrode extends and a sealing annulus surrounding said rod, and an outwardly extending neck on said wall and encircling said annulus, the material of the neck being deformed so as to clinch the neck around the annulus to form a liquid-tight joint.

19. In an electrolytic condenser, a metallic container having an apertured wall, an electrode in said container and an electrolyte in which said electrode is submerged, a rod supporting said electrode and extending through said aperture, and an insulating sleeve surrounding said rod where it passes the aperture, said sleeve being squeezed around said rod, and an attachment neck extending from said container, and means adapted to engage said neck to secure said container to a platform.

20. In combination with a supporting platform having an opening therethrough, an electrolytic condenser structure, comprising a substantially cylindrical container of conducting material and having a wall provided with a depending neck, said neck extending downwardly through said platform opening, an electrode within said container, electrical connecting means for said electrode and passing snugly through said neck, and means engaging the neck beneath the platform to secure the container on said platform.

21. In combination with a supporting platform having an opening therethrough, an electrolytic condenser structure comprising a container of conducting material and having a downwardly extending neck projecting through said platform opening and being threaded at its projecting portion, an electrode within said container, electrical connecting means for said electrode and passing snugly through said neck, and a nut engaging said threaded end of the neck with the platform to secure the container on said platform.

HAROLD I. DANZIGER.